United States Patent
Choi et al.

(10) Patent No.: US 11,607,680 B2
(45) Date of Patent: Mar. 21, 2023

(54) MICROPORE-FILLED DOUBLE-SIDED MEMBRANE FOR LOW VANADIUM ION PERMEABILITY AND METHOD FOR MANUFACTURING SAME

(71) Applicant: TORAY ADVANCED MATERIALS KOREA INC., Gyeongsangbuk-do (KR)

(72) Inventors: Young Woo Choi, Cheongju-si (KR); Mi Soon Lee, Jeonju-si (KR); Young Gi Yoon, Daejeon (KR); Tae Young Kim, Jeonju-si (KR); Min Ho Seo, Yongin-si (KR); Beom Jun Kim, Jeollabuk-do (KR); Chi Young Jung, Seongnam-si (KR); Jong Min Lee, Jeonju-si (KR)

(73) Assignee: Toray Advanced Materials Korea Inc, Gyeongsangbuk-do (KR)

( * ) Notice: Subject to any disclaimer, the term of this patent is extended or adjusted under 35 U.S.C. 154(b) by 154 days.

(21) Appl. No.: 17/057,682

(22) PCT Filed: Apr. 29, 2019

(86) PCT No.: PCT/KR2019/005137
§ 371 (c)(1),
(2) Date: Nov. 22, 2020

(87) PCT Pub. No.: WO2019/225873
PCT Pub. Date: Nov. 28, 2019

(65) Prior Publication Data
US 2021/0197187 A1    Jul. 1, 2021

(30) Foreign Application Priority Data
May 24, 2018  (KR) .................. 10-2018-0059292

(51) Int. Cl.
*H01M 8/18* (2006.01)
*B01J 43/00* (2006.01)
(Continued)

(52) U.S. Cl.
CPC ........... *B01J 43/00* (2013.01); *H01M 8/1032* (2013.01); *H01M 8/1058* (2013.01);
(Continued)

(58) Field of Classification Search
CPC ............. H01M 50/403; H01M 50/414; H01M 50/497; H01M 8/1023; H01M 8/1032;
(Continued)

(56) References Cited

U.S. PATENT DOCUMENTS 9,162,185 B2    10/2015 Ohmura et al.
2008/0216942 A1   9/2008 Hiraoka et al.
(Continued)

FOREIGN PATENT DOCUMENTS

JP    2014135144 A    7/2014
KR    20150049753 A  * 5/2015 ............. H01M 8/10
(Continued)

OTHER PUBLICATIONS

Machine Translation KR20150049753A (Year: 2015).*
(Continued)

*Primary Examiner* — Victoria H Lynch
(74) *Attorney, Agent, or Firm* — Snell & Wilmer L.L.P.

(57) ABSTRACT

Disclosed are a micropore-filled amphoteric membrane for low vanadium ion permeability, a method of manufacturing the same, and a vanadium redox flow battery including the amphoteric membrane. The micropore-filled amphoteric membrane for low vanadium ion permeability minimizes crossover of vanadium ions, which occurs between a catholyte and an anolyte in a redox flow battery, and has low membrane resistance and thus has remarkably improved
(Continued)

performance as compared to commercially available ion-exchange membranes such as Nafion, and accordingly, can be effectively used in the manufacture of a redox flow battery. In addition, the micropore-filled amphoteric membrane is continuously manufactured through a roll-to-roll process, and thus the manufacturing process is simple and manufacturing costs can be greatly reduced.

21 Claims, 3 Drawing Sheets

(51) Int. Cl.
*H01M 50/497* (2021.01)
*H01M 50/414* (2021.01)
*H01M 50/403* (2021.01)
*H01M 8/1032* (2016.01)
*H01M 8/1058* (2016.01)
*H01M 8/1072* (2016.01)

(52) U.S. Cl.
CPC ......... *H01M 8/1072* (2013.01); *H01M 8/188* (2013.01); *H01M 50/403* (2021.01); *H01M 50/414* (2021.01); *H01M 50/497* (2021.01)

(58) Field of Classification Search
CPC ............ H01M 8/1058; H01M 8/1062; H01M 8/1072; H01M 8/188; B01J 43/00; Y02E 60/10; Y02E 60/50; Y02P 70/50
See application file for complete search history.

(56) References Cited

U.S. PATENT DOCUMENTS

| 2009/0068530 | A1 | 3/2009 | Hiraoka et al. |
| 2014/0014519 | A1* | 1/2014 | Ohmura ................... B01J 41/14 |
| | | | 204/632 |

FOREIGN PATENT DOCUMENTS

| KR | 1020170056941 A | 5/2015 | |
| KR | 20180003925 A | 1/2018 | |
| WO | WO-2010082710 A1 * | 7/2010 | ......... B01D 67/0088 |
| WO | 2015064820 A1 | 5/2015 | |

OTHER PUBLICATIONS

Machine Translation KR20170056941A (Year: 2017).*
KIPO; Notice of Allowance dated Sep. 30, 2019 for KR 10-2018-0059292.
WIPO; International Search Report and Written Opinion dated Aug. 7, 2019 for PCT/KR2019/005137.
IPO; Office Action dated Mar. 9, 2021 in Application No. 202017053182.
EPO; Extended European Search Report dated Feb. 10, 2022 in Application No. 19808154.9.

* cited by examiner

MICROPORE-FILLED DOUBLE-SIDED MEMBRANE FOR LOW VANADIUM ION PERMEABILITY AND METHOD FOR MANUFACTURING SAME

CROSS-REFERENCE TO RELATED APPLICATIONS

This application is a national stage entry of International Patent Application No. PCT/KR2019/005137, filed Apr. 29, 2019, which claims priority to Korean Patent Application No. 10-2018-0059292 filed on May 24, 2018, the disclosures of which are hereby incorporated by reference in their entirety.

TECHNICAL FIELD

The present disclosure relates to a micropore-filled amphoteric membrane for low vanadium ion permeability, a method of manufacturing the same, and a vanadium redox flow battery including the amphoteric membrane.

BACKGROUND ART

Recently, existing power generation systems, such as thermal power generation, which cause greenhouse gas generation and environmental pollution problems due to the use of fossil fuels, or nuclear power generation, which have problems in terms of facility stability and waste disposal, have had various limitations. Thus, research on the development of more eco-friendly and high-efficiency energy and the development of power supply systems using the same is greatly increasing.

In this regard, there is ongoing development of secondary batteries which are lightweight and can convert electrical energy into chemical energy and store the same and, if necessary, can convert chemical energy into electrical energy and use the same.

In particular, lithium-ion batteries, sodium-sulfur batteries, redox flow batteries, supercapacitors, lead storage batteries, and the like have been developed or are being developed as high-capacity power storage systems. Among these, redox flow batteries (RFBs) as high-capacity and high-efficiency secondary batteries, which are most suitable for large-scale systems such as power storage, are receiving much attention.

Unlike other batteries, such redox flow batteries are batteries that have a mechanism for storing energy by redox reactions of respective ions at an anode and a cathode by using an active material as ions in an aqueous solution state rather than a solid state, and depending on the redox couple, there are types such as V/Br, Zn/Br, and V/V. Among these, a vanadium redox flow battery (VRB) has a high open circuit voltage, and can use the same type of redox materials in a cathode/anode, and thus has been researched much more than other types of redox flow batteries.

Meanwhile, a vanadium redox flow battery uses an electrolyte solution as a transfer medium, and thus requires an ion-exchange membrane. The ion-exchange membrane is a key material that determines the lifespan and manufacturing costs of vanadium redox flow batteries, and to be applied to a system using, as an electrolyte solution, a transition metal-containing strongly acidic substance, the ion-exchange membrane requires excellent acid resistance and oxidation resistance, low permeability, and excellent mechanical properties.

In particular, the ion-exchange membrane serves to prevent battery performance deterioration due to the contamination of an electrolyte, caused by crossover of $V^{4+}$ and $V^{5+}$ ions of a catholyte to an anolyte or crossover of $V^{2+}$ and $V^{3+}$ ions of an anolyte to a catholyte.

However, an ion-exchange membrane currently used in redox flow batteries is a separator generally used in existing lithium secondary batteries and the like, and such an existing separator has problems in that ion crossover between a catholyte and an anolyte occurs and battery energy density is reduced.

For example, Nafion, which is a typical commercially available ion-exchange membrane, is widely used as an ion-exchange membrane for a redox flow battery due to high ionic conductivity and excellent chemical stability thereof. However, Nifion is not only expensive but also has low permeation selectivity due to a disadvantage in which vanadium ions easily permeate the membrane, thus having a problem with performance deterioration. In addition, complicated manufacturing processes are required to manufacture the ion-exchange membrane.

Therefore, the inventors of the present disclosure conducted research in order to address the above-described problems and developed an amphoteric membrane with low permeability of vanadium ions, the membrane including both anion and cation-exchange polymer electrolytes, and confirmed that the amphoteric membrane has a low membrane resistance value as well as low vanadium permeability. In addition, it has been confirmed that, by being manufactured through a roll-to-roll process, the amphoteric membrane is able to be mass-produced within a short time, and thus can be manufactured more economically, thus completing the present disclosure.

In this regard, Korean Patent Registration No. 10-1858419 discloses a method of reducing membrane permeability for vanadium ions and a vanadium redox battery including a membrane manufactured by the method.

DESCRIPTION OF EMBODIMENTS

Technical Problem

The present disclosure has been made to address the above-described problems, and an embodiment of the present disclosure provides a micropore-filled amphoteric membrane for low vanadium ion permeability.

An embodiment of the present disclosure also provides a method of manufacturing a micropore-filled amphoteric membrane for low vanadium ion permeability, through a roll-to-roll process.

An embodiment of the present disclosure also provides a vanadium redox flow battery including the micropore-filled amphoteric membrane for low vanadium ion permeability.

Technical problems to be solved by the present disclosure are not limited to the above-described technical problems, and other unmentioned technical problems will become apparent from the following description to those of ordinary skill in the art.

Solution to Problem

As a technical means for achieving the above-described technical challenges, an aspect of the present disclosure provides a micropore-filled amphoteric membrane for low vanadium ion permeability, including: a polymer support having a porous structure; and an amphoteric ion-exchange polymer electrolyte including anion and cation exchange polymer electrolytes impregnated in the polymer support, wherein the amphoteric ion-exchange polymer electrolyte is not formed outside the polymer support, and the porous structure of the polymer support is exposed on a surface of an amphoteric ion-exchange polymer electrolyte composite membrane.

The amphoteric ion-exchange polymer electrolyte may be formed by impregnating the polymer support with a solution including a sulfonic acid-containing electrolyte monomer, an electrolyte monomer of a quaternary ammonium salt, a triazine-based crosslinking agent, and an initiator and then crosslinking the solution.

The sulfonic acid-containing electrolyte monomer may include a material selected from the group consisting of 2-methyl-2-propene-1-sulfonic acid sodium salt, 3-sulfopropyl methacrylate potassium salt, 2-acrylamido-2-methyl-1-propanesulfonic acid sodium salt, and combinations thereof.

The electrolyte monomer of the quaternary ammonium salt may include a material selected from the group consisting of [2-(acryloyloxy)ethyl]trimethylammonium chloride, (3-acrylamidopropyl)trimethylammonium chloride, and combinations thereof.

The triazine-based crosslinking agent may include a material selected from the group consisting of 1,3,5-triacryloyl-hexahydro-1,3,5-triazine, diallyl isocyanurate, triallyl isocyanurate, and combinations thereof.

A molar ratio of the electrolyte monomer to the crosslinking agent may be 1:0.05-0.2.

The micropore-filled amphoteric membrane for low vanadium ion permeability may have an area specific resistance (ASR) of 0.35 $\Omega \cdot cm^2$ or less.

The micropore-filled amphoteric membrane for low vanadium ion permeability may have a predominant surface roughness height of 200 nm to 350 nm.

A ratio of a thickness of the micropore-filled amphoteric membrane for low vanadium ion permeability to a thickness of the polymer support may be in a range of 1.0 to 1.03.

The micropore-filled amphoteric membrane for low vanadium ion permeability may have a thickness of 8 μm to 30 μm.

A weight ratio of the polymer support to the amphoteric ion-exchange polymer electrolyte may be in a range of 1:0.8 to 1:1.1.

The micropore-filled amphoteric membrane for low vanadium ion permeability may have a vanadium permeability of $0.10 \times 10^{-9}$ $cm^2/min$ to $0.50 \times 10^{-9}$ $cm^2/min$.

Another aspect of the present disclosure provides a method of manufacturing a micropore-filled amphoteric membrane for low vanadium ion permeability, from which a surface ion-exchange polymer electrolyte is removed, the method including: preparing an amphoteric ion-exchange precursor solution including an electrolyte monomer of a quaternary ammonium salt having a cationic group, a sulfonic acid-containing electrolyte monomer having an anionic group, a triazine-based crosslinking agent, an initiator, and a solvent; impregnating a porous polymer support with the amphoteric ion-exchange precursor solution; feeding an upper film, the porous polymer support, and a lower film into a compression roll to respectively compress the upper film and the lower film on upper and lower portions of the polymer support; irradiating the porous polymer support on which the upper film and the lower film have been compressed, with heat or light, to crosslink the amphoteric ion-exchange precursor solution and thereby prepare a micropore-filled amphoteric ion-exchange polymer electrolyte; and detaching the prepared micropore-filled amphoteric ion-exchange polymer electrolyte-containing polymer support, the upper film, and the lower film, from a detachment roll.

The porous polymer support may have a pore volume of 40% to 50%, a pore size of 0.07 μm to 0.1 μm, and a thickness of 8 μm to 30 μm.

The porous polymer support may be hydrophilized with sulfone or hydrophilically treated with a surfactant before being impregnated with the amphoteric ion-exchange precursor solution.

The upper film and the lower film may include a material selected from the group consisting of poly(ethylene terephthalate) (PET), polyimide, polyvinyl chloride, low density polyethylene, low density polypropylene, and combinations thereof.

A surface of each of the upper film and the lower film in contact with the porous polymer support may be hydrophilically treated.

The compression may be performed through squeeze compression to have a value that is lower than a total thickness of the porous polymer support and the films that are fed into the compression roll.

The value may be 5 μm to 20 μm smaller than the total thickness of the porous polymer support and the films that are fed into the compression roll.

During the crosslinking, the temperature of the porous polymer support and the films may be 75° C. or less.

Through the detachment, a crosslinking polymerized polymer resin formed outside the porous polymer support may be transferred to the upper film and the lower film to be removed.

Another aspect of the present disclosure provides a vanadium redox flow battery including: an anode; a cathode; a micropore-filled amphoteric membrane for low vanadium ion permeability provided between the anode and the cathode; an anolyte supply unit including an electrolyte solution supplied to the anode; and a catholyte supply unit including an electrolyte solution supplied to the cathode.

The anolyte may include a material selected from the group consisting of $VSO_4$, $V_2(SO_4)_3$, and combinations thereof.

The catholyte may include a material selected from the group consisting of $(VO_2)_2SO_4$, $VO(SO_4)$, and combinations thereof.

Advantageous Effects of Disclosure

According to an embodiment of the present disclosure, the micropore-filled amphoteric membrane for low vanadium ion permeability minimizes crossover of vanadium ions, which occurs between a catholyte and an anolyte in a redox flow battery, and has low membrane resistance and thus has remarkably improved performance as compared to commercially available ion-exchange membranes such as Nafion, and accordingly, can be effectively used in the manufacture of a redox flow battery.

In addition, the micropore-filled amphoteric membrane is continuously manufactured through a roll-to-roll process, and thus the manufacturing process is simple and manufacturing costs can be greatly reduced.

The effects of the present disclosure are not limited to the above-described effects, and should be understood to include all effects inferred from the detailed description of the present disclosure and the configurations of the present disclosure described in the accompanying claims.

MODE OF DISCLOSURE

Figure 1:
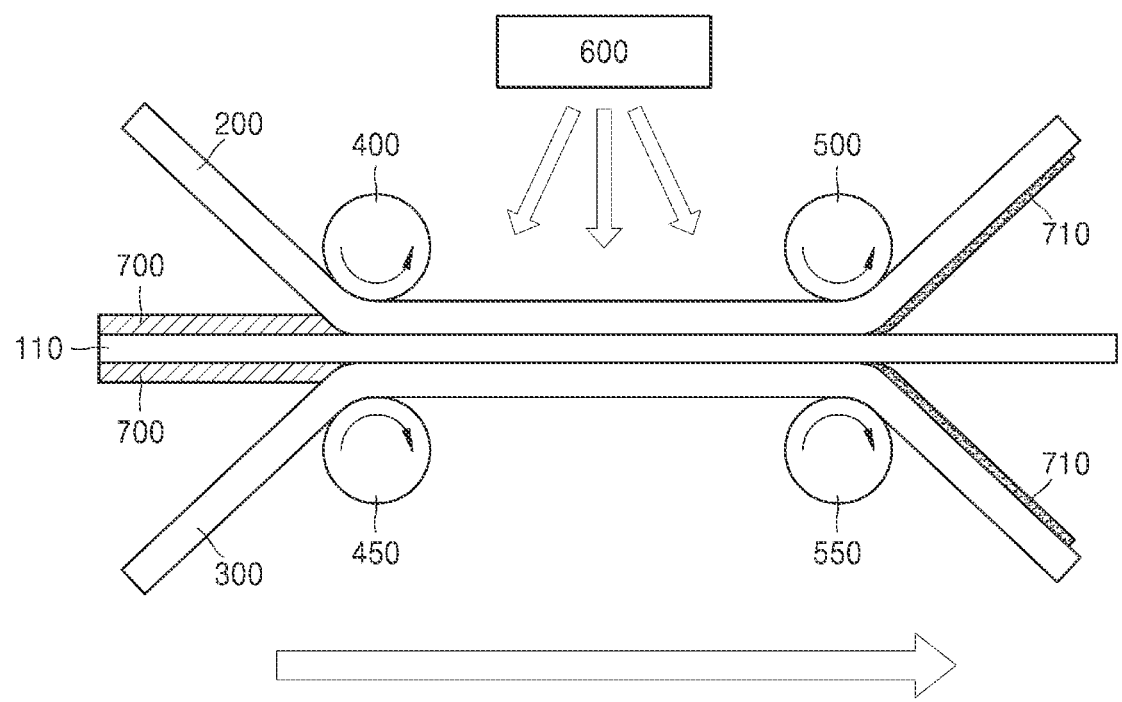
FIG. 1 is a schematic view illustrating a roll-to-roll manufacturing process for a micropore-filled amphoteric membrane for low vanadium ion permeability according to an embodiment of the present disclosure.

Hereinafter, the present disclosure will be described in more detail. However, the present disclosure may be embodied in various different forms, is not limited by embodiments set forth herein, and should be defined by the appended claims.

In addition, terms used herein are only used to describe specific embodiments and are not intended to limit the present disclosure. An expression used in the singular is interpreted to include an expression in the plural unless the context clearly indicates otherwise. Throughout the specification of the present disclosure, "including" an element means that, unless otherwise specifically stated, other elements are not precluded and also may mean that other elements are further included.

A first embodiment of the present application provides a micropore-filled amphoteric membrane for low vanadium ion permeability, including: a polymer support having a porous structure; and an amphoteric ion-exchange polymer electrolyte including anion and cation exchange polymer electrolytes impregnated in the polymer support, wherein the amphoteric ion-exchange polymer electrolyte is not formed outside the polymer support, and the porous structure of the polymer support is exposed on a surface of an amphoteric ion-exchange polymer electrolyte composite membrane.

Detailed descriptions of the same parts as in the first embodiment of the present application will be omitted, but the descriptions of the first embodiment of the present application can equally apply to a second embodiment although the descriptions thereof are omitted.

Hereinafter, the micropore-filled amphoteric membrane for low vanadium ion permeability according to the first embodiment of the present application will be described in detail.

In one embodiment of the present application, the micropore-filled amphoteric membrane for low vanadium ion permeability may include both an anion exchange polymer electrolyte and a cation exchange polymer electrolyte. As described below with regard to a third embodiment of the present application, this is a novel configuration in which, when the amphoteric membrane is used in a vanadium redox flow battery, protons contained in an electrolyte solution are allowed to permeate, while vanadium ions are not allowed to permeate. Detailed descriptions thereof will be provided below.

In one embodiment of the present application, the micropore-filled amphoteric membrane for low vanadium ion permeability may have a surface from which a single ion-exchange polymer electrolyte layer is removed.

In one embodiment of the present application, "the amphoteric ion-exchange polymer electrolyte is not formed outside the polymer support" should be interpreted as a meaning that the amphoteric ion-exchange polymer electrolyte may be formed on 'at least a portion of the polymer support.' In addition, "the porous structure of the polymer support is exposed on a surface of an amphoteric ion-exchange polymer electrolyte composite membrane" should be interpreted as a meaning that at least a portion of the porous structure may be exposed, and it should be interpreted that the porous structure on the surface of the porous support is exposed.

In one embodiment of the present application, the micropore-filled amphoteric membrane for low vanadium ion permeability may have no byproducts on a surface thereof since a crosslinking polymerized polymer resin formed outside the porous polymer support is removed, and may have a small thickness. For example, the manufactured amphoteric membrane may have a thickness of about 8 μm to about 30 μm, preferably about 24 μm.

In one embodiment of the present application, the amphoteric ion-exchange polymer electrolyte may be formed by impregnating the polymer support with a solution including a sulfonic acid-containing electrolyte monomer, an electrolyte monomer of a quaternary ammonium salt, a triazine-based crosslinking agent, and an initiator, and then subjecting the solution to crosslinking polymerization.

In one embodiment of the present application, the sulfonic acid-containing electrolyte monomer may include a material selected from the group consisting of 2-methyl-2-propene-1-sulfonic acid sodium salt, 3-sulfopropyl methacrylate potassium salt, 2-acrylamido-2-methyl-1-propanesulfonic acid sodium salt, and combinations thereof.

In one embodiment of the present application, the electrolyte monomer of the quaternary ammonium salt may include a material selected from the group consisting of [2-(acryloyloxy)ethyl]trimethylammonium chloride, (3-acrylamidopropyl)trimethylammonium chloride, and combinations thereof.

In one embodiment of the present application, the triazine-based crosslinking agent may include a material selected from the group consisting of 1,3,5-triacryloylhexahydro-1,3,5-triazine, diallyl isocyanurate, triallyl isocyanurate, and combinations thereof.

In one embodiment of the present application, a molar ratio of the electrolyte monomer to the crosslinking agent may be 1:0.05-0.2, preferably 1:0.1-0.2.

In one embodiment of the present application, the micropore-filled amphoteric membrane for low vanadium ion permeability may have an area specific resistance (ASR) of 0.35 Ω·cm$^2$ or less.

In one embodiment of the present application, the micropore-filled amphoteric membrane for low vanadium ion permeability may predominantly have a surface roughness height of 200 nm to 350 nm, preferably 250 nm to 350 nm, and may be in a range of 300 nm to 350 nm according to detachment conditions and monomers used. The surface roughness height may have various values, but it is expressed "predominantly" that the above range may be included most, and the above range can be considered an average of the roughness height. Meanwhile, the roughness average of the amphoteric membrane may be in the range of 10 nm to 60 nm, preferably in the range of 25 nm to 45 nm. Within the above range, the micropore-filled amphoteric membrane for low vanadium ion permeability may exhibit maximum performance. Thus, since the surface roughness of the micropore-filled amphoteric membrane for low vanadium ion permeability is high, turbulence flow occurs in a solution flowing in the amphoteric membrane, and thus a diffusion boundary layer has a small value, allowing ions of the solution (e.g., protons) to more smoothly permeate into the amphoteric membrane. More specifically, in the case of an amphoteric membrane having a small surface roughness, a solution flows through the amphoteric membrane in the form of laminar flow, causing the occurrence of a bottleneck phenomenon, and thus ions of the solution are not allowed to entirely flow in the composite membrane, such that the diffusion boundary layer has a high value. In contrast, in the case of the micropore-filled amphoteric membrane for low vanadium ion permeability, turbulence flow occurs in a solution flowing through the amphoteric membrane, allowing ions of the solution to entirely flow in the composite membrane, such that ion-exchange can proceed more efficiently. Meanwhile, when the amphoteric membrane is used in a vanadium redox flow battery, the ions may be protons.

In one embodiment of the present application, a ratio of the thickness of the micropore-filled amphoteric membrane for low vanadium ion permeability to the thickness of the polymer support may be in the range of 1.0 to 1.03. Since the polymer support is filled with the amphoteric ion-exchange polymer electrolyte, the resulting composite membrane has the same thickness as that of the polymer support or is somewhat thick due to surface roughness occurring while the polymer electrolyte on the surface thereof is removed. When the thickness ratio exceeds 1.03, the polymer electrolyte may not be completely removed from the surface of the composite membrane, and this may act as an obstacle to ion exchange. For example, it may be preferred that the thickness ratio is in the range of 1.0 to 1.02.

In one embodiment of the present application, a weight ratio of the polymer support to the amphoteric ion-exchange polymer electrolyte may be in the range of 1:0.8 to 1:1.1. When the weight ratio of the amphoteric ion-exchange polymer electrolyte filled in the polymer support is less than 1:0.8, the amphoteric ion-exchange polymer electrolyte is unable to be sufficiently filled, and thus it may be difficult to exhibit physical and electrochemical properties as a desirable ion-exchange membrane. When the weight ratio exceeds 1:1.1, the polymer electrolyte remains on the surface of the amphoteric membrane, and thus it may be difficult to induce the occurrence of turbulence flow, which is characteristic of the amphoteric membrane.

In one embodiment of the present application, the micropore-filled amphoteric membrane for low vanadium ion permeability may have a vanadium permeability of $0.10 \times 10^{-9}$ cm$^2$/min to $0.50 \times 10^{-9}$ cm$^2$/min.

A second embodiment of the present application provides a method of manufacturing a micropore-filled amphoteric membrane for low vanadium ion permeability, from which a surface ion-exchange polymer electrolyte is removed, the method including: preparing an amphoteric ion-exchange precursor solution 700 including an electrolyte monomer of a quaternary ammonium salt having a cationic group, a sulfonic acid-containing electrolyte monomer having an anionic group, a triazine-based crosslinking agent, an initiator, and a solvent; impregnating a porous polymer support 110 with the amphoteric ion-exchange precursor solution 700; feeding an upper film 200, the porous polymer support 110, and a lower film 300 into a compression roll to respectively compress the upper film 200 and the lower film 300 on upper and lower portions of the polymer support 110; irradiating the porous polymer support 110 80 which the upper film 200 and the lower film 300 have been compressed, with heat or light, to crosslink the amphoteric ion-exchange precursor solution 700 and thereby prepare a micropore-filled amphoteric ion-exchange polymer electrolyte; and detaching the prepared micropore-filled amphoteric ion-exchange polymer electrolyte-containing polymer support 110, the upper film 200, and the lower film 300, from a detachment roll.

Detailed descriptions of the same parts as in the first embodiment of the present application will be omitted, but the descriptions of the first embodiment of the present application can equally apply to a second embodiment although the descriptions thereof are omitted.

Hereinafter, the method of manufacturing a micropore-filled amphoteric membrane for low vanadium ion permeability from which a surface ion-exchange polymer electrolyte is removed, according to the second embodiment of the present application, will be described in detail step by step with reference to FIG. 1. FIG. 1 is a schematic view illustrating a roll-to-roll manufacturing apparatus 101 for a roll-to-roll manufacturing process used in the manufacture of the micropore-filled amphoteric membrane for low vanadium ion permeability from which a surface ion-exchange polymer electrolyte is removed.

First, in one embodiment of the present application, the method of manufacturing a micropore-filled amphoteric membrane for low vanadium ion permeability, from which a surface ion-exchange polymer electrolyte is removed, includes preparing the amphoteric ion-exchange precursor solution 700 including an electrolyte monomer of a quaternary ammonium salt having a cationic group, a sulfonic acid-containing electrolyte monomer having an anionic group, a triazine-based crosslinking agent, an initiator, and a solvent.

In one embodiment of the present application, the quaternary ammonium salt having a cationic group may be represented by Formula 1 below.

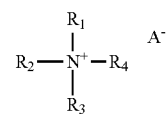

[Formula 1]

wherein, in Formula 1, $R_1$ to $R_4$ may be a substituted or unsubstituted linear or branched alkyl or aryl, and A may be a halogen atom.

In one embodiment of the present application, the electrolyte monomer of the quaternary ammonium salt having a cationic group may include, for example, a material selected from the group consisting of [2-(acryloyloxy)ethyl]trimethylammonium chloride, (3-acrylamidopropyl)trimethylammonium chloride, and combinations thereof.

In one embodiment of the present application, the sulfonic acid-containing salt having an anionic group may be represented by Formula 2 below.

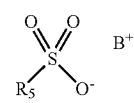

[Formula 2]

wherein, in Formula 2, $R_5$ may be a substituted or unsubstituted linear or branched alkyl or aryl, and B may be hydrogen and a metal element.

In one embodiment of the present application, the sulfonic acid-containing electrolyte monomer having an anionic group may be in the form of a salt or an acid, and may include, for example, a material selected from the group consisting of 2-methyl propene-1-sulfonic acid sodium salt, 3-sulfopropyl methacrylate potassium salt, 2-acrylamido-2-methyl-1-propanesulfonic acid sodium salt, and combinations thereof.

In one embodiment of the present application, the triazine-based crosslinking agent may be, preferably, a 1,3,5-triazine-based material.

In one embodiment of the present application, the triazine-based crosslinking agent may include a material selected from the group consisting of 1,3,5-triacryloylhexahydro-1,3,5-triazine, diallyl isocyanurate, triallyl isocyanurate, and combinations thereof.

In one embodiment of the present application, the crosslinking agent determines the degree of crosslinking of the manufactured micropore-filled amphoteric membrane for low vanadium ion permeability, and thus the degree of swelling and mechanical properties of the amphoteric membrane may be controlled according to the amount of the crosslinking agent.

In one embodiment of the present application, the initiator is a photoinitiator, and may be, for example, any one of the Darocur or Irgacure series manufactured by Ciba Geigy, Switzerland, or may be 2-hydroxy-2-methy-1-phenylpropane-1-one.

In one embodiment of the present application, the solvent may be a water-soluble solvent such as water, methanol or ethanol. Preferably, the solvent may be water.

In one embodiment of the present application, in the preparation of the amphoteric ion-exchange precursor solution 700, a molar ratio of the electrolyte monomer of the quaternary ammonium salt having a cationic group to the sulfonic acid-containing electrolyte monomer having an anionic group is 1:1-1.5, and thus the amount of the electrolyte monomer of the quaternary ammonium salt may be identical to or smaller than the amount of the sulfonic acid-containing electrolyte monomer.

In one embodiment of the present application, a molar ratio of the electrolyte monomers (the electrolyte monomer of the quaternary ammonium salt having a cationic group and the sulfonic acid-containing electrolyte monomer having an anionic group) to the crosslinking agent may be 1:0.05-0.2, preferably 1:0.1-0.2. When the molar ratio of the crosslinking agent is less than the above range, the degree of crosslinking is insufficient, and thus the durability of the manufactured amphoteric membrane may be reduced. When the molar ratio of the crosslinking agent exceeds the above range, the degree of crosslinking is too high, and thus the ionic conductivity of the manufactured amphoteric membrane may be remarkably reduced.

In one embodiment of the present application, the amount of the solvent may be in the range of 0.5 parts by weight to 1.5 parts by weight, preferably 1 part by weight, with respect to 1 part by weight of the electrolyte monomers. In addition, the amount of the initiator may be in the range of 0.1 parts by weight to 0.5 parts by weight with respect to 100 parts by weight of the amphoteric ion-exchange precursor solution.

Next, in one embodiment of the present application, the method of manufacturing a micropore-filled amphoteric membrane for low vanadium ion permeability, from which a surface ion-exchange polymer electrolyte is removed, includes impregnating the porous polymer support 110 with the amphoteric ion-exchange precursor solution 700.

In one embodiment of the present application, the porous polymer support 110 is not limited as long as it is a hydrocarbon-based polymer, and may include, for example, a material selected from the group consisting of polyethylene, polypropylene, polyimide, polyamideimide, polypropyleneoxide, polyethersulfone, polyurethane, and combinations thereof, but the present disclosure is not limited thereto.

In one embodiment of the present application, the porous polymer support 110 may have a pore volume of 40% to 50%, a pore size of 0.07 μm to 0.1 μm, and a thickness of 8 μm to 30 μm. When the porous polymer support does not satisfy the properties, the micropore-filled amphoteric membrane for low vanadium ion permeability may not be easily manufactured.

In one embodiment of the present application, the porous polymer support 110 may be hydrophilized with sulfone or hydrophilically treated with a surfactant before being impregnated with the amphoteric ion-exchange precursor solution 700.

In one embodiment of the present application, in the hydrophilization with sulfone, hydrophilization pretreatment may be performed by immersing the porous polymer support 110 in a mixed solution of 98% or more sulfuric acid and 96% or more chlorosulfuric acid in a weight ratio of 1:1 to 3:1, allowing a reaction to occur at 30° C. to 60° C. for 2 hours to 5 hours, more preferably at 45° C. to 50° C. for 3 hours to 4 hours, and then washing the porous polymer support with a 1 N to 3 N sodium hydroxide solution for one day or longer.

In one embodiment of the present application, the surfactant may be any surfactant capable of causing hydrophilization, and may be, for example, a material selected from the group consisting of dodecylbenzenesulfonic acid (DBSA), alkylbenzenesulfonic acid (ABS), linearalklybenzenesulfonic acid (LAS), alphasulfonic acid (AS), alphaolefinsulfonic acid (AOS), alcoholpolyoxyethyleneether (AE), alcoholpolyoxyethyleneethersulfonic acid (AES), and combinations thereof. Preferably, dodecylbenzenesulfonic acid may be used. When a hydrophobic portion of the surfactant binds to the surface of the polymer support 110, which is hydrophobic, through a hydrophobic-hydrophobic interaction, a hydrophilic portion of the surfactant replaces the surface of the polymer support 110, resulting in the occurrence of hydrophilization. In this regard, not only the outer surface of the polymer support 110 but also the entire surfaces of pores therein may be hydrophilized with the surfactant. As the entire surfaces of the pores are hydrophilized, the amphoteric ion-exchange precursor solution, which is hydrophilic, can be effectively and easily filled into the pores through a hydrophilic-hydrophilic interaction. Specifically, the surfaces of the pores may be hydrophilized using a method of immersing the porous polymer support 110 in a solution in which 0.5 percent by weight to 1 percent by weight of a commercially available surfactant is diluted in water, for 1 minute to 2 minutes, followed by drying.

Next, in one embodiment of the present application, the method of manufacturing a micropore-filled amphoteric membrane for low vanadium ion permeability, from which a surface ion-exchange polymer electrolyte is removed, includes feeding an upper film 200, the porous polymer support 110, and a lower film 300 into a compression roll to respectively compress the upper film 200 and the lower film 300 on upper and lower portions of the polymer support 110. In this regard, the compression roll may include an upper compression roll 400 and a lower compression roll 450 that are separated from each other in a vertical direction. That is, two compression rolls may be used.

In one embodiment of the present application, the upper film 200 and the lower film 300 may be formed of poly(ethylene terephthalate) (PET).

In one embodiment of the present application, the upper film 200 and the lower film 300 may have a thickness of about 30 μm to about 70 μm, preferably about 50 μm to about 60 μm, but the present disclosure is not limited thereto. When the thicknesses of the upper film 200 and the lower film 300 are less than 30 μm, the porous polymer support 110 and the upper and lower films 200 and 300 are not smoothly detached after a crosslinking reaction, which will be described below, and thus the porous polymer support 110 may be torn. When the thicknesses of the upper film 200 and the lower film 300 are greater than 70 μm, the films are too thick during the crosslinking reaction, which will be described below, and thus heat or light is not sufficiently irradiated to the porous polymer support 110, and accordingly, the crosslinking reaction does not occur sufficiently.

In one embodiment of the present application, a surface of each of the upper film 200 and the lower film 300 in contact with the porous polymer support 110 may not be water-repellent treated or may be hydrophilically treated. The hydrophilic treatment may be hydrophilic treatment with silicone, polyvinyl alcohol, polyallylamine hydrochloride, polyvinylamine, polystyrenesulfonic acid, polyvinylsulfonic acid, or the like, preferably hydrophilic treatment with silicone. That is, by hydrophilically treating the surface of each of the upper film 200 and the lower film 300 in contact with the porous polymer support 100, binding thereof to the porous polymer support 110 that is hydrophilized with a surfactant may be facilitated.

In one embodiment of the present application, the compression may be performed through squeeze compression to have a value that is lower than a total thickness of the porous polymer support 110 and the films 200 and 300 that are fed into the compression roll. In this regard, the squeeze compression may be performed at a pressure of about 50 kgf/cm$^2$ to about 100 kgf/cm$^2$. That is, through the squeeze compression, the porous polymer support 110 and the films 200 and 300 are more strongly bonded, and thus as described below, a crosslinking polymerized polymer resin 710 formed outside the porous polymer support 110 may be more easily transferred to the upper film 200 and the lower film 300 to be removed.

In one embodiment of the present application, the value may be about 5 μm to about 20 μm, preferably about 10 μm to about 15 μm, smaller than the total thickness of the porous polymer support 110 and the films 200 and 300 that are fed into the compression roll. When the value is less than 5 μm, in the subsequent detachment process, the crosslinking polymerized polymer resin 710 formed outside the porous polymer support 110 may not be satisfactorily transferred to the upper film 200 and the lower film 300 and not be removed. When the value exceeds 20 μm, in the detachment process, the porous polymer support 110 and the upper and lower films 200 and 300 may not be easily detached.

In one embodiment of the present application, a rate at which the upper film 200, the porous polymer support 110, and the lower film 300 are fed into the compression roll may be in the range of about 0.5 M/min to about 2 M/min, but the present disclosure is not limited thereto. When the rate is less than 0.5 M/min, the manufacturing process slowly proceeds, resulting in reduced production efficiency. When the rate exceeds 2 M/min, the manufacturing process proceeds rapidly, and thus, in the subsequent process, crosslinking of the amphoteric ion-exchange precursor solution 700 may not occur smoothly, but the present disclosure is not limited thereto.

Next, in one embodiment of the present application, the method of manufacturing a micropore-filled amphoteric membrane for low vanadium ion permeability, from which a surface ion-exchange polymer electrolyte is removed, includes irradiating the porous polymer support 110 on which the upper film 200 and the lower film 300 have been compressed, with heat or light, to crosslink the amphoteric ion-exchange precursor solution 700 and thereby prepare a micropore-filled amphoteric ion-exchange polymer electrolyte.

In one embodiment of the present application, the irradiation of ultraviolet rays may be performed on both upper and lower sides of the porous polymer support 110 on which the upper film 200 and the lower film 300 have been compressed.

In one embodiment of the present application, the irradiated light may be, for example, ultraviolet rays, and ultraviolet rays may be classified into UVA, UVB, and UVV, and the ultraviolet rays may have different wavelength bands. Specifically, UVA may have a wavelength band of about 320 nm to about 400 nm, UVB may have a wavelength band of about 280 nm to about 320 nm, and UVV may have a wavelength band of about 400 nm to about 450 nm.

In one embodiment of the present application, energy of the irradiated ultraviolet rays may be in the range of about 40 mW/cm$^2$ to about 50 mW/cm$^2$ for UVA, in the range of about 30 mW/cm$^2$ to about 50 mW/cm$^2$ for UVB, and in the range of about 30 mW/cm$^2$ to about 50 mW/cm$^2$ for UVV. Preferably, the energy may be about 47 mW/cm$^2$ for UVA, about 37 mW/cm$^2$ for UVB, and about 35 mW/cm$^2$ for UVV. When the energy of the irradiated ultraviolet rays is less than the above range, crosslinking of the amphoteric ion-exchange precursor solution 700 may not proceed smoothly. When the energy of the irradiated ultraviolet rays exceeds the above range, energy is too strong, and there is a problem in which the porous polymer support 110, the upper film 200, and the lower film 300 may be carbonized, but the present disclosure is not limited thereto.

In one embodiment of the present application, the irradiation of ultraviolet rays may be performed for about 360 seconds to about 480 seconds for UVA, for about 360 seconds to about 480 seconds for UVB, and for about 360 seconds to about 480 seconds for UVV. When the irradiation of ultraviolet rays is performed for less than the above range, crosslinking of the amphoteric ion-exchange precursor solution 700 may not proceed smoothly. When the irradiation of ultraviolet rays is performed for greater than the above range, there is a problem in which the porous polymer support 110, the upper film 200, and the lower film 300 may be carbonized, but the present disclosure is not limited thereto.

In one embodiment of the present application, during the crosslinking reaction, the temperature of the porous polymer support 110 and the films 200 and 300 may be about 75° C. or less, and preferably, the temperature may be in the range of about 60° C. to about 75° C. When the temperature exceeds 75° C., evaporation of the solvent in the amphoteric ion-exchange precursor solution 700 may be triggered, and thus a crosslinking reaction by polymerization may not be induced, and there may be a problem in which the porous polymer support 110 and the films 200 and 300 may be carbonized.

Next, in one embodiment of the present application, the method of manufacturing a micropore-filled amphoteric membrane for low vanadium ion permeability, from which a surface ion-exchange polymer electrolyte is removed, includes detaching the prepared micropore-filled amphoteric ion-exchange polymer electrolyte-containing polymer support 110, the upper film 200, and the lower film 300, from a detachment roll. In this case, the detachment roll may include an upper detachment roll 500 and a lower detachment roll 550 that are separated from each other in a vertical direction. That is, two detachment rolls may be used.

In one embodiment of the present application, through the detachment, the crosslinking polymerized polymer resin 710 formed outside the porous polymer support 110 may be transferred to the upper film 200 and the lower film 300 to be removed.

In one embodiment of the present application, an interval between the upper detachment roll 500 and the lower detachment roll 550 may be the same as the total thickness of the porous polymer support 110 and the films 200 and 300 before being fed into the compression roll. In this case, the porous polymer support 110 before being fed into the compression roll indicates the polymer support 110 before being impregnated with the amphoteric ion-exchange precursor solution 700. That is, the thickness of the porous polymer support 110 may be the thickness of the polymer support 110 not including the amphoteric ion-exchange precursor solution 700.

In one embodiment of the present application, the detachment may be performed by respectively pulling, from opposite sides, the upper film 200 and the lower film 300 that have passed through the detachment roll. In this case, directions of the opposite sides may be diagonal directions from the upper detachment roll 500 and the lower detachment roll 550, respectively.

In one embodiment of the present application, the method of manufacturing an amphoteric ion-exchange polymer electrolyte composite membrane is continuously performed by a roll-to-roll process, and thus the manufacturing process is simple and manufacturing costs may be greatly reduced.

A third embodiment of the present application provides a vanadium redox flow battery including: an anode; a cathode; a micropore-filled amphoteric membrane for low vanadium ion permeability provided between the anode and the cathode; an anolyte supply unit including an electrolyte solution supplied to the anode; and a catholyte supply unit including an electrolyte solution supplied to the cathode.

Detailed descriptions of the same parts as in the first and second embodiments of the present application will be omitted, but the descriptions of the first and second embodiments of the present application can equally apply to a third embodiment although the descriptions thereof are omitted.

Hereinafter, the vanadium redox flow battery according to the third embodiment of the present application will be described in detail.

In one embodiment of the present application, the anolyte supply unit and the catholyte supply unit may include a tank for storing each electrolyte solution and a pump that serves to transfer each electrolyte solution stored in the tank to the anode or the cathode.

In one embodiment of the present application, the principle of operation of the vanadium redox flow battery will be briefly described. A catholyte solution is stored in a tank on the catholyte supply unit side, and during charging/discharging, the catholyte solution is transferred to a cathode through a cathode active material inlet via a pump, and then when a redox reaction is completed, the catholyte solution is transferred again through a cathode active material outlet to the tank on the catholyte supply unit side. The anolyte solution also flows between the tank and the electrode, as described above.

In one embodiment of the present application, the catholyte solution and the anolyte solution may include a strong acid or a mixed solvent of a strong acid and water, and an electrolyte dissolved therein. In this regard, it can be determined that the vanadium redox flow battery has excellent performance when the micropore-filled amphoteric membrane for low vanadium ion permeability permeates protons of a strong acid, while not allowing vanadium ions included in the dissolved electrolyte to permeate. Thus, the micropore-filled amphoteric membrane for low vanadium ion permeability according to the present application includes an anion exchange polymer electrolyte that easily binds to a cationic group, thus allowing protons of a strong acid to easily permeate, and includes a cation exchange polymer electrolyte that does not easily binds to a cationic group, thus not allowing vanadium ions to easily permeate. This may be achieved by the amphoteric membrane including both the anion and cation exchange polymer electrolytes as described above since the size of vanadium ions is larger than that of protons.

In one embodiment of the present application, the anolyte may include a material selected from the group consisting of $VSO_4$, $V_2(SO_4)_3$, and combinations thereof.

In one embodiment of the present application, the catholyte may include a material selected from the group consisting of $(VO_2)_2SO_4$, $VO(SO_4)$, and combinations thereof.

Hereinafter, examples of the present disclosure will be described in detail in such a way that those of ordinary skill in the art may easily carry out the disclosure. However, the present disclosure may be embodied in various different forms and is not limited by examples described herein.

Manufacture Example 1. Manufacture 1 of Micropore-filled Amphoteric Membrane for Low Vanadium Ion Permeability for Redox Flow Battery To manufacture a micropore-filled amphoteric membrane for low vanadium ion permeability, 2-methyl-2-propene-1-sulfonic acid sodium salt, [2-(acryloyloxy)ethyl]trimethylammonium chloride, and 1,3,5-triacryloylhexahydro-1,3,5-triazine were mixed in a molar ratio of 0.5:0.5:0.07, and deionized water was mixed therewith in an amount of 1 part by weight with respect to 1 part by weight of the mixture. Subsequently, 2-hydroxy-2-methyl-1-phenylpropane-1-one that was diluted in an amount of 10 wt % in methanol, as a photoinitiator was mixed with the resulting mixture in an amount of 0.1 parts by weight to 0.5 parts by weight with respect to 100 parts by weight of the mixed solution in which water was mixed, thereby preparing an amphoteric ion-exchange precursor solution 700.

Next, a polyolefin porous polymer support, of which pore surfaces were hydrophilized by immersion for 1 minute to 2 minutes in a solution in which 0.5 percent by weight to 1 percent by weight of a commercially available surfactant (dodecylbenzenesulfonic acid (DBSA)) was diluted in water, followed by drying, and having a thickness of 16 μm, an average pore size of 0.07 μm, and a pore volume of 45%, was impregnated with the amphoteric ion-exchange precursor solution 700, and the precursor solution was allowed to sufficiently permeate into the support.

Thereafter, to stack poly(ethylene terephthalate) (PET) films having a thickness of 50 μm on upper and lower sides of the polyolefin porous polymer support into which the precursor solution had permeated, the support and the films were fed at a rate of 1 M/min into the upper compression roll 400 and the lower compression roll 450 by using the roll-to-roll manufacturing apparatus 101 illustrated in FIG. 1. In this case, a surface of each of the films in contact with the support was hydrophilically treated using silicone before being fed into the compression rolls. Meanwhile, the pressure of the upper compression roll 400 and the lower compression roll 450 was 50 kgf/cm$^2$, and squeeze compression was performed such that the total thickness of the support and the films was reduced by 10 μm.

Then, the support and the films that had been fed into the compression roll were irradiated with ultraviolet rays having an intensity of about 47 mW/cm$^2$ for UVA, an intensity of about 37 mW/cm$^2$ for UVB, or an intensity of about 35 mW/cm$^2$ for UVV to crosslink the amphoteric ion-exchange precursor solution 700 permeated into the support, thereby synthesizing an amphoteric ion-exchange polymer electrolyte. In this case, the temperature of the support and the films was 75° C.

The support including the synthesized amphoteric ion-exchange polymer electrolyte and the films were allowed to pass through the upper detachment roll 500 and the lower detachment roll 550 to be separated from each other. At this time, an interval between the upper detachment roll 500 and the lower detachment roll 550 was the same as the total thickness of the porous polymer support and the films before being fed into the compression roll, and while a crosslinking polymerized polymer resin formed outside the support passed through the detachment roll, the polymer resin was transferred to the upper film 200 and the lower film 300 and removed. Thereafter, the support including the synthesized amphoteric ion-exchange polymer electrolyte was washed several times with ultrapure water, thereby obtaining a micropore-filled amphoteric membrane for low vanadium ion permeability.

Manufacture Example 2. Manufacture 2 of Micropore-filled Amphoteric Membrane for Low Vanadium Ion Permeability for Redox Flow Battery A micropore-filled amphoteric membrane for low vanadium ion permeability was manufactured in the same manner as in Manufacture Example 1, except that 2-methyl-2-propene-1-sulfonic acid sodium salt, [2-(acryloyloxy)ethyl] trimethylammonium chloride, and 1,3,5-triacryloylhexahydro-1,3,5-triazine were mixed in a molar ratio of 0.5:0.5:0.11.

Manufacture Example 3. Manufacture 3 of Micropore-filled Amphoteric Membrane for Low Vanadium Ion Permeability for Redox Flow Battery A micropore-filled amphoteric membrane for low vanadium ion permeability was manufactured in the same manner as in Manufacture Example 1, except that 2-methyl-2-propene-1-sulfonic acid sodium salt, [2-(acryloyloxy)ethyl] trimethylammonium chloride, and 1,3,5-triacryloylhexahydro-1,3,5-triazine were mixed in a molar ratio of 0.5:0.5:0.16.

Example 1. Manufacture 1 of Vanadium Redox Flow Battery Single Unit Cell

Figure 2:
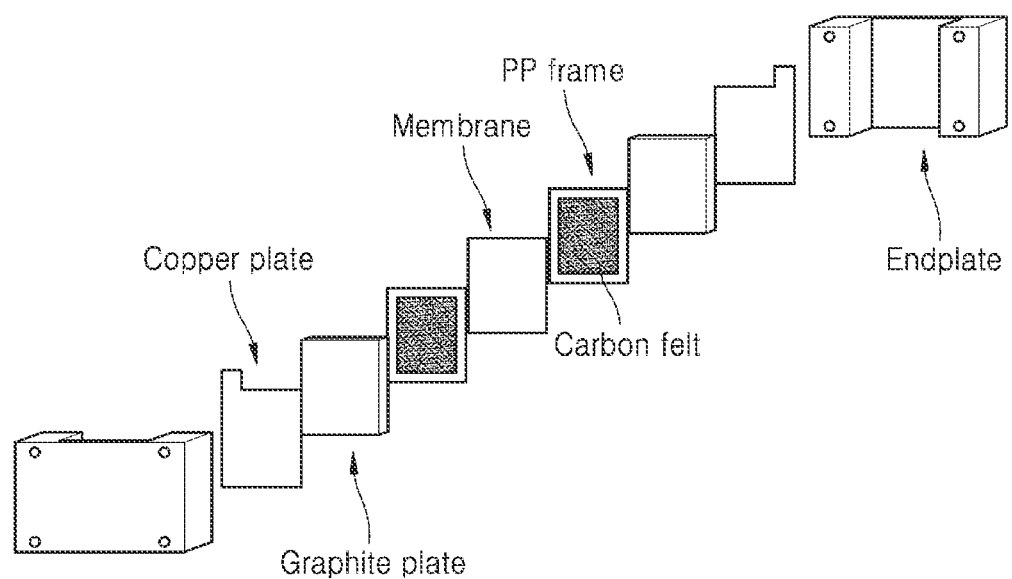
FIG. 2 is a schematic view of a non-flow single unit cell used for the measurement of an open circuit voltage (OCV), according to an embodiment of the present disclosure.

As illustrated in FIG. 2, an air-oxidized polyacrylonitrile (PAN)-based carbon felt (thickness of 5 mm and area of 12 cm$^2$ (3 cm×4 cm)) provided on a polypropylene (PP) frame, a graphite plate (thickness of 5 mm, area of 30 cm$^2$ [5 cm×6 cm], weight of 446 g/m$^2$, bulk density of 0.08-0.1 g/cm$^3$, purity of 99.99%, and specific resistance of 0.15 Ω·cm), a copper plate, and an end plate were sequentially stacked on both sides of the micropore-filled amphoteric membrane for low vanadium ion permeability manufactured according to Manufacture Example 1, thereby completing the manufacture of a vanadium redox flow battery non-flow single unit cell.

Example 2. Manufacture 2 of Vanadium Redox Flow Battery Single Unit Cell

A vanadium redox flow battery non-flowing single unit cell was manufactured in the same manner as in Example 1, except that the micropore-filled amphoteric membrane for low vanadium ion permeability manufactured according to Manufacture Example 2 was used.

Example 3. Manufacture 3 of Vanadium Redox Flow Battery Single Unit Cell

A vanadium redox flow battery non-flowing single unit cell was manufactured in the same manner as in Example 1, except that the micropore-filled amphoteric membrane for low vanadium ion permeability manufactured according to Manufacture Example 3 was used.

Comparative Example 1. Manufacture 1 of Vanadium Redox Flow Battery Single Unit Cell Including Only Cation Exchange Polymer Electrolyte A vanadium redox flow battery single unit cell was manufactured in the same manner as in Manufacture Example 1 and Example 1, except that [2-(acryloyloxy) ethyl]trimethylammonium chloride was not mixed.

Comparative Example 2. Manufacture 2 of Vanadium Redox Flow Battery Single Unit Cell Including Only Cation Exchange Polymer Electrolyte A vanadium redox flow battery single unit cell was manufactured in the same manner as in Manufacture Example 2 and Example 2, except that [2-(acryloyloxy) ethyl]trimethylammonium chloride was not mixed.

Comparative Example 3. Manufacture 3 of Vanadium Redox Flow Battery Single Unit Cell Including Only Cation-Exchange Polymer Electrolyte A vanadium redox flow battery single unit cell was manufactured in the same manner as in Manufacture Example 3 and Example 3, except that [2-(acryloyloxy) ethyl]trimethylammonium chloride was not mixed.

Comparative Example 4. Manufacture of Vanadium Redox Flow Battery Including Commercially Available Nafion Exchange Membrane A vanadium redox flow battery was manufactured in the same manner as in Example 1, except that a commercially available nafion 117 exchange membrane was included instead of the micropore-filled amphoteric membrane for low vanadium ion permeability.

Experimental Example 1. Measurement of Membrane Water Contents of Vanadium Redox Flow Batteries Manufactured According to Examples and Comparative Examples The membrane water contents of the vanadium redox flow batteries manufactured according to the examples and the comparative examples were measured, and the membrane water content was measured on the basis of changes in weight (W) and area (A) of each membrane before and after drying. Specifically, membrane specimens having a size of 25 cm² (5 cm×5 cm) were sufficiently immersed in 2M $H_2SO_4$ overnight, and then were put in a vacuum oven at 70° C. so that moisture was completely removed. When the volume of a membrane is measured, it is affected by the ambient humidity. Thus, each membrane was transferred to an airtight container and lengths increased longitudinally and transversely and the thickness of each membrane were measured, and the membrane was immersed again in an ultrapure water solution at 25° C. overnight and then taken out therefrom, and lengths increased longitudinally and transversely and the thickness of each membrane were immediately measured. The measured water contents are shown in Table 1 below.

Figure 3:
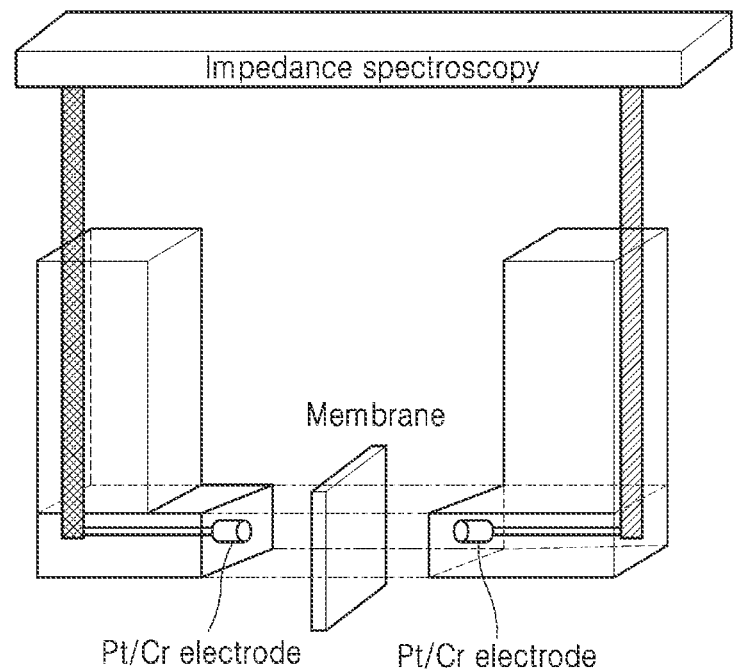
FIG. 3 is a schematic view illustrating a membrane resistance measurement cell according to an experimental example of the present disclosure.

Experimental Example 2. Measurement of Membrane Resistances of Vanadium Redox Flow Batteries Manufactured According to Examples and Comparative Examples To measure the membrane resistance of each of the vanadium redox flow batteries manufactured according to the examples and the comparative examples, an AC impedance measurement method was used. Specifically, each membrane was impregnated with a 2M $H_2SO_4$ solution containing 2M $VOSO_4$ for 24 hours, and then a clip cell and an LCR meter as shown in FIG. 3 were connected thereto to measure the electric resistance, and membrane resistance values were calculated from Equation 1 below. In Equation 1 below, $r_1$ refers to a measured resistance value, $r_2$ refers to a solution resistance value in the absence of a membrane, and S refers to the area (cm²) of the clip cell. The measured membrane resistance values are shown in Table 1 below.

$$R = (r_1 - r_2) \times S \qquad <\text{Equation 1}>$$

Figure 4:
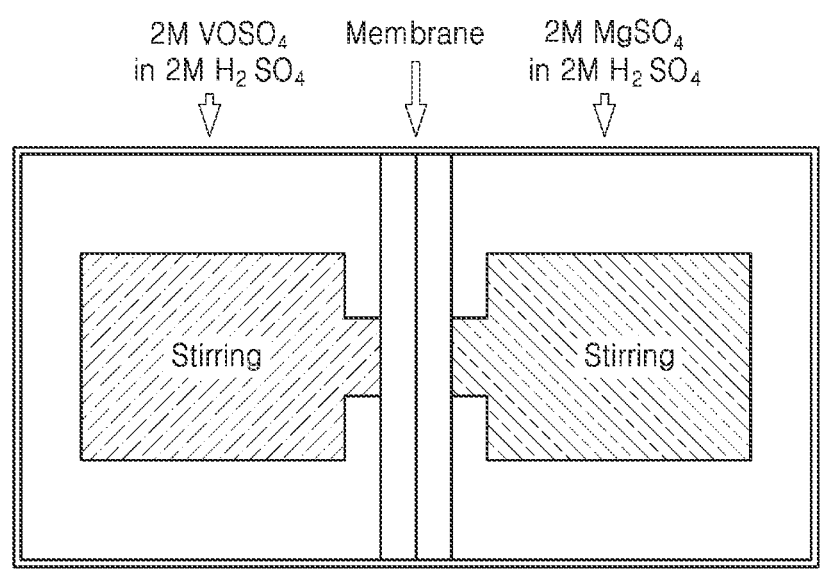
FIG. 4 is a schematic view illustrating a vanadium permeability measurement device according to an experimental example of the present disclosure.

Experimental Example 3. Measurement of Vanadium Permeability of Vanadium Redox Flow Batteries Manufactured According to Examples and Comparative Examples To measure the vanadium permeability of each of the vanadium redox flow batteries manufactured according to the examples and the comparative examples, a vanadium permeability measurement apparatus as illustrated in FIG. 4 was used, and the vanadium permeability was calculated using Equation 2 below.

$$P = \frac{V_B L C_B(t)}{C_A A(t - t_0)} \qquad <\text{Equation 2}>$$

Figure 5:
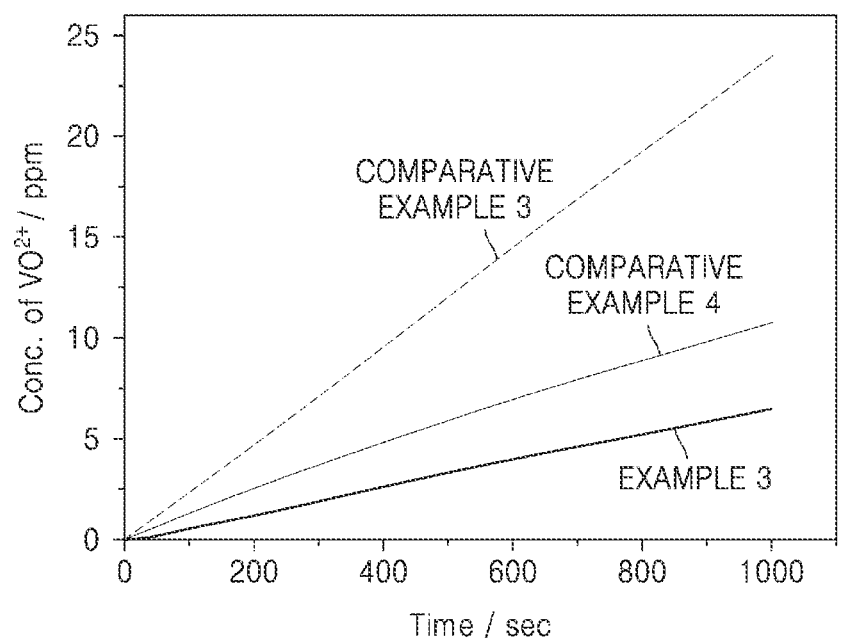
FIG. 5 is a graph showing the vanadium permeability over time of membranes of examples and comparative examples according to an experimental example of the present disclosure.

In Equation 2, CA refers to the concentration (M) of $VOSO_4$, $C_B(t)$ refers to the concentration of $VO^{2+}$ on the $MgSO_4$ side at time t, VB refers to volume (cm³) on the $MgSO_4$ side, L refers to a membrane thickness (cm), A refers to an effective membrane area (cm²), and P refers to the permeability (cm²/min) of $VO^{2+}$. The permeability of vanadium that was calculated using Equation 2 is shown in Table 1 below, and the permeability of vanadium over time of each of the vanadium redox flow batteries manufactured according to Example 3 and Comparative Examples 3 and 4 is illustrated in FIG. 5. As shown in Table 1 and FIG. 5, the vanadium redox flow battery manufactured according to the example exhibited lower vanadium permeability, i.e., 0.14×$10^{-9}$ cm²/min to 0.43×$10^{-9}$ cm²/min, than those of the cases of comparative examples, and also exhibited relatively low membrane resistance, i.e., 0.24 Ω·cm² to 0.35 Ω·cm². Generally, it can be determined that, when both vanadium permeability and membrane resistance are low, a vanadium redox flow battery exhibits excellent performance, and it can be confirmed that, since vanadium redox flow batteries manufactured according to the present application exhibit low vanadium permeability and low membrane resistance, they have excellent performance.

TABLE 1

| | Electrolyte monomer (mol) | | Crosslinking agent | Water content | Vanadium Permeability min) | Membrane resistance | Membrane thickness |
|---|---|---|---|---|---|---|---|
| | Cation | Anion | (mol) | (%) | ($10^{-9}$ cm²/min) | (Ω · cm²) | (μm) |
| Example 1 | 0.5 | 0.5 | 0.07 | 80 | 0.43 | 0.24 | 24 |
| Example 2 | 0.5 | 0.5 | 0.11 | 64 | 0.28 | 0.30 | 24 |
| Example 3 | 0.5 | 0.5 | 0.16 | 60 | 0.14 | 0.35 | 24 |
| Comparative Example 1 | 1 | — | 0.07 | 88 | 0.62 | 0.20 | 24 |
| Comparative Example 2 | 1 | — | 0.11 | 65 | 0.58 | 0.21 | 25 |
| Comparative Example 3 | 1 | — | 0.16 | 60 | 0.46 | 0.25 | 26 |
| Comparative Example 4 | — | — | — | 38 | 1.68 | 0.49 | 187 |

The invention claimed is:

1. A micropore-filled amphoteric membrane for low vanadium ion permeability for vanadium redox flow battery, the micropore-filled amphoteric membrane comprising:
    a polymer support having a porous structure; and
    an amphoteric ion-exchange polymer electrolyte impregnated in the polymer support and comprising anion and cation exchange polymer electrolytes,
    wherein the amphoteric ion-exchange polymer electrolyte is not formed outside the polymer support, and
    the porous structure of the polymer support is exposed on a surface of an amphoteric ion-exchange polymer electrolyte composite membrane,
    wherein a dominant surface roughness height of the micropore-filled amphoteric membrane is from 200 nm to 350 nm,
    wherein the micropore-filled amphoteric membrane is configured to allow permeate protons contained in a solution flowing through the micropore-filled amphoteric membrane, while vanadium ions are not allowed to permeate.

2. The micropore-filled amphoteric membrane of claim 1, wherein the amphoteric ion-exchange polymer electrolyte is formed by impregnating the polymer support with a solution including a sulfonic acid-containing electrolyte monomer, an electrolyte monomer of a quaternary ammonium salt, a triazine-based crosslinking agent, and an initiator and then crosslinking the solution.

3. The micropore-filled amphoteric membrane of claim 2, wherein the sulfonic acid-containing electrolyte monomer comprises a material selected from the group consisting of 2-methyl-2-propene-1-sulfonic acid sodium salt, 3-sulfopropyl methacrylate potassium salt, 2-acrylamido-2-methyl-1-propanesulfonic acid sodium salt, and combinations thereof.

4. The micropore-filled amphoteric membrane of claim 2, wherein the electrolyte monomer of the quaternary ammonium salt comprises a material selected from the group consisting of [2-(acryloyloxy)ethyl]trimethylammonium chloride, (3-acrylamidopropyl)trimethylammonium chloride, and combinations thereof.

5. The micropore-filled amphoteric membrane of claim 2, wherein the triazine-based crosslinking agent comprises a material selected from the group consisting of 1,3,5-triacryloylhexahydro-1,3,5-triazine, diallyl isocyanurate, triallyl isocyanurate, and combinations thereof.

6. The micropore-filled amphoteric membrane of claim 2, wherein a molar ratio of the electrolyte monomer to the crosslinking agent is 1:0.05-0.2.

7. The micropore-filled amphoteric membrane of claim 1, wherein the micropore-filled amphoteric membrane has an area specific resistance (ASR) of 0.35 $\Omega \cdot cm^2$ or less.

8. The micropore-filled amphoteric membrane of claim 1, wherein a ratio of a thickness of the micropore-filled amphoteric membrane to a thickness of the polymer support is in a range of 1.0 to 1.03.

9. The micropore-filled amphoteric membrane of claim 1, wherein the micropore-filled amphoteric membrane has a thickness of 8 μm to 30 μm.

10. The micropore-filled amphoteric membrane of claim 1, wherein a weight ratio of the polymer support to the amphoteric ion-exchange polymer electrolyte is in a range of 1:0.8 to 1:1.1.

11. The micropore-filled amphoteric membrane of claim 1, wherein the micropore-filled amphoteric membrane has a vanadium permeability of $0.10 \times 10^{-9}$ $cm^2$/min to $0.50 \times 10^{-9}$ $cm^2$/min.

12. A vanadium redox flow battery comprising:
    an anode;
    a cathode;
    the micropore-filled amphoteric membrane according to claim 1 provided between the anode and the cathode;
    an anolyte supply unit comprising an electrolyte solution supplied to the anode; and
    a catholyte supply unit comprising an electrolyte solution supplied to the cathode.

13. The vanadium redox flow battery of claim 12, wherein the anolyte comprises a material selected from the group consisting of $VSO_4$, $V_2(SO_4)_3$, and combinations thereof.

14. The vanadium redox flow battery of claim 12, wherein the catholyte comprises a material selected from the group consisting of $(VO_2)_2SO_4$, $VO(SO_4)$, and combinations thereof.

15. A method of manufacturing a micropore-filled amphoteric membrane for low vanadium ion permeability for vanadium redox flow battery, from which a surface ion-exchange polymer electrolyte is removed, the method comprising:
    preparing an amphoteric ion-exchange precursor solution including an electrolyte monomer of a quaternary ammonium salt having a cationic group, a sulfonic acid-containing electrolyte monomer having an anionic group, a triazine-based crosslinking agent, an initiator, and a solvent;
    impregnating a porous polymer support with the amphoteric ion-exchange precursor solution;
    feeding an upper film, the porous polymer support, and a lower film into a compression roll to respectively compress the upper film and the lower film on upper and lower portions of the polymer support;
    irradiating the porous polymer support on which the upper film and the lower film have been compressed, with heat or light, to crosslink the amphoteric ion-exchange precursor solution and thereby prepare a micropore-filled amphoteric ion-exchange polymer electrolyte; and
    detaching the prepared micropore-filled amphoteric ion-exchange polymer electrolyte-containing polymer support, the upper film, and the lower film, from a detachment roll,
    wherein the compression is performed through squeeze compression to have a value that is lower than a total thickness of the porous polymer support and the films that are fed into the compression roll and the value is 5 μm to 20 μm smaller than the total thickness of the porous polymer support and the films that are fed into the compression roll,
    wherein a dominant surface roughness height of the micropore-filled amphoteric membrane is from 200 nm to 350 nm,
    wherein the micropore-filled amphoteric membrane is configured to allow permeate protons contained in a solution flowing through the micropore-filled amphoteric membrane, while vanadium ions are not allowed to permeate.

16. The method of claim 15, wherein the porous polymer support has a pore volume of 40% to 50%, a pore size of 0.07 μm to 0.1 μm, and a thickness of 8 μm to 30 μm.

17. The method of claim 15, wherein the porous polymer support is hydrophilized with sulfone or hydrophilically treated with a surfactant before being impregnated with the amphoteric ion-exchange precursor solution.

18. The method of claim 15, wherein the upper film and the lower film comprise a material selected from the group consisting of poly(ethylene terephthalate) (PET), polyimide, polyvinyl chloride, low density polyethylene, low density polypropylene, and combinations thereof.

19. The method of claim 15, wherein a surface of each of the upper film and the lower film in contact with the porous polymer support is hydrophilically treated.

20. The method of claim 15, wherein, during the crosslinking, a temperature of the porous polymer support and the films is 75° C. or less.

21. The method of claim 15, wherein, through the detaching, a crosslinking polymerized polymer resin formed outside the porous polymer support is transferred to the upper film and the lower film to be removed.

\* \* \* \* \*